US012566555B2

(12) United States Patent
Dong

(10) Patent No.: US 12,566,555 B2
(45) Date of Patent: *Mar. 3, 2026

(54) STORING NON-VOLATILE MEMORY INITIALIZATION FAILURES

(71) Applicant: Micron Technology, Inc., Boise, ID (US)

(72) Inventor: Qi Dong, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,080

(22) Filed: Jul. 18, 2024

(65) Prior Publication Data

US 2024/0370183 A1 Nov. 7, 2024

Related U.S. Application Data

(63) Continuation of application No. 17/889,810, filed on Aug. 17, 2022, now Pat. No. 12,050,779.

(60) Provisional application No. 63/348,302, filed on Jun. 2, 2022.

(51) Int. Cl.
*G06F 3/06* (2006.01)

(52) U.S. Cl.
CPC .......... *G06F 3/0619* (2013.01); *G06F 3/0632* (2013.01); *G06F 3/0683* (2013.01)

(58) Field of Classification Search
None
See application file for complete search history.

(56) References Cited

U.S. PATENT DOCUMENTS

| | | |
|---|---|---|
| 2006/0053246 A1 | 3/2006 | Lee |
| 2010/0082893 A1 | 4/2010 | Ma |
| 2016/0118121 A1 | 4/2016 | Kelly |

FOREIGN PATENT DOCUMENTS

| | | | |
|---|---|---|---|
| JP | 2008084291 | 4/2008 | |
| JP | 2012129632 | 7/2012 | |
| WO | 2017023270 | 2/2017 | |
| WO | WO-2017023270 A1 * | 2/2017 | ............... G06F 1/30 |

* cited by examiner

*Primary Examiner* — Brian R Peugh
(74) *Attorney, Agent, or Firm* — Brooks, Cameron & Huebsch, PLLC

(57) ABSTRACT

The present disclosure includes apparatuses, methods, and systems for storing non-volatile memory initialization failures. In an example, a method can include initializing a volatile memory die, initializing a first non-volatile memory die in response to initializing the volatile memory die, copying executable instructions from the first non-volatile memory die to the volatile memory die in response to initializing the first non-volatile memory die, initializing the second non-volatile memory die in response to initializing the first non-volatile memory die, and storing a failure record in the first non-volatile memory die in response to an error occurring during the initialization of the second non-volatile memory die.

20 Claims, 3 Drawing Sheets

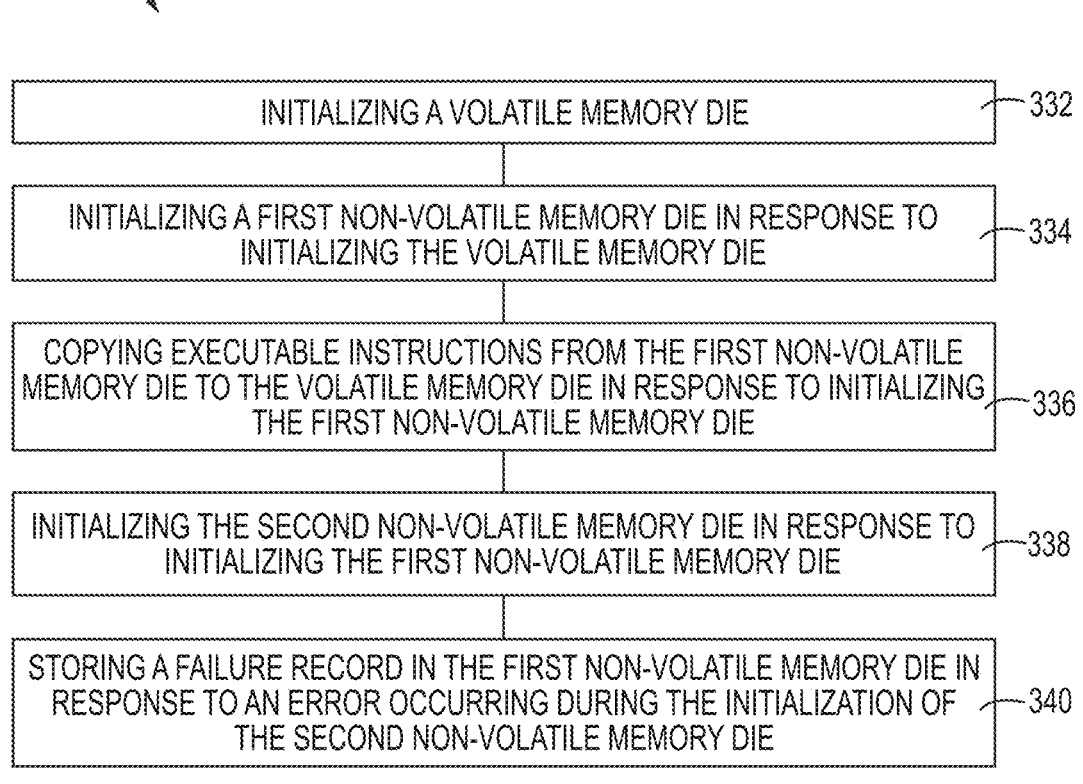

330

| INITIALIZING A VOLATILE MEMORY DIE |
| :---: |

332

| INITIALIZING A FIRST NON-VOLATILE MEMORY DIE IN RESPONSE TO INITIALIZING THE VOLATILE MEMORY DIE |
| :---: |

334

| COPYING EXECUTABLE INSTRUCTIONS FROM THE FIRST NON-VOLATILE MEMORY DIE TO THE VOLATILE MEMORY DIE IN RESPONSE TO INITIALIZING THE FIRST NON-VOLATILE MEMORY DIE |
| :---: |

336

| INITIALIZING THE SECOND NON-VOLATILE MEMORY DIE IN RESPONSE TO INITIALIZING THE FIRST NON-VOLATILE MEMORY DIE |
| :---: |

338

| STORING A FAILURE RECORD IN THE FIRST NON-VOLATILE MEMORY DIE IN RESPONSE TO AN ERROR OCCURRING DURING THE INITIALIZATION OF THE SECOND NON-VOLATILE MEMORY DIE |
| :---: |

STORING NON-VOLATILE MEMORY INITIALIZATION FAILURES

PRIORITY INFORMATION

This application is a continuation of U.S. application Ser. No. 17/889,810, filed Aug. 17, 2022, which issues as U.S. Pat. No. 12,050,779 on Jul. 30, 2024, which claims the benefit of U.S. Provisional Application No. 63/348,302, filed on Jun. 2, 2022, then contents of which are incorporated herein by reference.

TECHNICAL FIELD

The present disclosure relates generally to non-volatile memory and methods, and more particularly, to storing non-volatile memory initialization failures

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory.

A host can utilize memory devices to store data. A host can be a vehicle, for example. Vehicles are becoming more dependent upon memory devices to provide storage for components that were previously mechanical, independent, or non-existent. A vehicle can include a computing system, which can be a host for a memory device. The vehicle may be driver operated, driver-less (autonomous), and/or partially autonomous.

BRIEF DESCRIPTION OF THE DRAWINGS

FIG. 3 is a flow diagram of a method for storing non-volatile memory initialization failures in accordance with an embodiment of the present disclosure.

DETAILED DESCRIPTION

Figure 1:
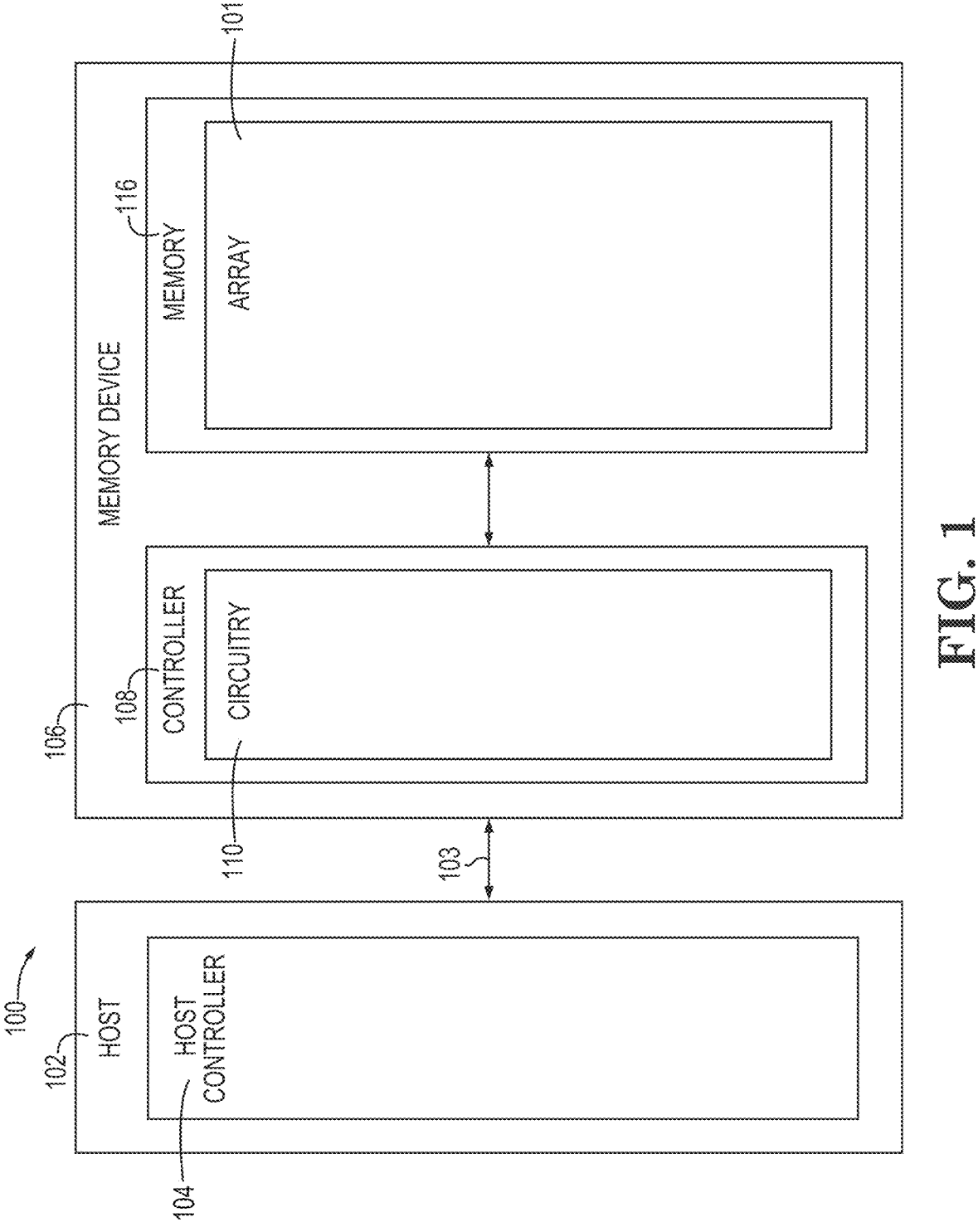
FIG. 1 is a block diagram of a computing system including a host and an apparatus in the form of a memory device in accordance with an embodiment of the present disclosure.

The present disclosure includes apparatuses, methods, and systems for storing non-volatile memory initialization failures. In an example, a method can include initializing (e.g., booting) a volatile memory die, initializing a first non-volatile memory die in response to initializing the volatile memory die, copying executable instructions (e.g., firmware) from the first non-volatile memory die to the volatile memory die in response to initializing the first non-volatile memory die, initializing the second non-volatile memory die in response to initializing the first non-volatile memory die, and storing a failure record in the first non-volatile memory die in response to an error occurring during the initialization of the second non-volatile memory die.

Failures during an initialization of a non-volatile memory die can go undetected because the firmware has no opportunity to record failure information. Accordingly, without failure information, a memory device can be unable to inform a host of the occurrence of an initialization failure. Initialization failures can be common in vehicle systems and industrial applications. For example, an initialization of a memory device used in a black box, a telemetry system, an infotainment center, an instrument cluster, or a dashboard of a vehicle can be interrupted by an engine start or an initialization of a memory device used in an automation tool can be interrupted by a glitch in the power grid.

Even if an initialization of a memory device has an opportunity to be recovered, the memory device may be vulnerable to another failure or the firmware may be susceptible to entering a wrong branch due to incorrect data output from an error occurring during the initialization. Furthermore, it may take a host a long time to identify and confirm a root cause of an initialization failure because these errors tend to be intermittent with lower failure rates. As such, it can be beneficial to initialize a volatile memory die prior to non-volatile memory dies to allow a host to receive executable instructions from the volatile memory die and execute the executable instructions with the capability to store and download information (e.g., data) so that if an error occurs during an initialization of a non-volatile memory die, the executable instructions can record and store the initialization failure.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "X" and "Y", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

FIG. 1 is a block diagram of a computing system 100 including a host 102 and an apparatus in the form of a memory device 106 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 100 can include a number of memory devices analogous to memory device 106.

In the embodiment illustrated in FIG. 1, memory device 106 can include a memory 116 having a memory array 101. Memory 116 can be one or more memory dies. Although one memory array 101 is illustrated in FIG. 1, memory 116 can include any number of memory arrays analogous to memory array 101.

Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, although not shown in FIG. 1, memory array 101 can be located on a particular semiconductor die along with various peripheral circuitry associated with the operation thereof.

Memory array 101 can have a number of physical blocks of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells can be included in a plane of memory cells, and a number of planes of memory cells can be included on a die. For instance, each physical block can be part of a single die. That is, the portion of memory array 101 illustrated in FIG. 1 can be a die of memory cells. Each physical block can include a number of physical rows of memory cells coupled to access lines (e.g., word lines). The number of rows (e.g., word lines) in each physical block can be 32, but embodiments are not limited to a particular number of rows per physical block. Further, although not shown in FIG. 1, the memory cells can be coupled to columns of sense lines (e.g., data lines and/or digit lines).

As one of ordinary skill in the art will appreciate, each row can include a number of pages of memory cells (e.g., physical pages). A physical page refers to a unit of programming and/or sensing (e.g., a number of memory cells that are programmed and/or sensed together as a functional group). In a number of embodiments, each row can comprise one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

In some examples, a page of memory cells can comprise a number of physical sectors (e.g., subsets of memory cells). Each physical sector of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks, rows, sectors, and pages are possible. For example, rows of physical blocks can each store data corresponding to a single logical sector which can include, for example, more or less than 512 bytes of data.

As illustrated in FIG. 1, host 102 can be coupled to the memory device 106 via host interface 103. Host 102 and memory device 106 can communicate (e.g., send commands and/or data) on host interface 103. The computing system 100 including host 102 and/or memory device 106 can be, or be part of, an Internet of Things (IOT) enabled device, a vehicle, an automation tool, an industrial protocol camera among other host systems, and can include a memory access device (e.g., a processor). One of ordinary skill in the art will appreciate that "a processor" can intend one or more processors, such as a parallel processing system, a number of coprocessors, etc.

In a number of embodiments, the host 102 can execute instructions to provide an overall control system and/or operating system for a vehicle. The host 102 can include a host controller 104 designed to assist in automation endeavors of the vehicle. For example, the host 102 can be an advanced driver assistance system controller (ADAS). An ADAS can monitor data to prevent accidents and provide warning of potentially unsafe situations. For example, the ADAS can monitor sensors in the vehicle and take control of vehicle operations to avoid accident or injury (e.g., to avoid accidents in the case of an incapacitated user of a vehicle). The host 102 may need to act and make decisions quickly to avoid accidents. The memory device 106 can store reference data such that data from the sensors can be compared to the reference data by the host 102 in order to make quick decisions.

The host 102 can write data received from one or more sensors and store the data (e.g., in association with a black box application for the vehicle). The black box application may also be referred to as an accident data recorder. With the advent of autonomous vehicles, some autonomous driving requires real time buffering of telemetric data such as video cameras, RADAR, LIDAR, ultra-sonic and other sensors necessary to playback the sequences preceding an accident. Such data yields a considerable quantity of data per unit time for sequential write throughput from the host 102. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 102 can execute instructions to provide a set of applications for the vehicle including telemetry, infotainment, and a black box. The telemetry application can provide information displayable on a user interface such as may be associated with the instrumentation and/or dashboard of a vehicle. An example of such telemetric information is the speed at which the vehicle is traveling (e.g., based at least in part on data from a sensor). The infotainment application can include information and/or entertainment for a user of the vehicle displayable or interfaced via the user interface. Examples of such information and/or entertainment include music, movies, GPS information such as a moving map, etc. The memory device 116 can provide storage for any of the set of applications.

Host interface 103 can be in the form of a standardized physical interface. For example, when memory device 106 is used for information storage in computing system 100, host interface 103 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, host interface 103 can provide an interface for passing control, address, information (e.g., data), and other signals between memory device 106 and host 102 having compatible receptors for host interface 103.

Memory device 106 includes controller 108 to communicate with host 102 and with memory 116 (e.g., memory array 101). For instance, controller 108 can send commands to perform operations on memory array 101, including operations to sense (e.g., read), program (e.g., write), move, and/or erase data, among other operations.

Controller 108 can be included on the same physical device (e.g., the same die) as memory 116. Alternatively, controller 108 can be included on a separate physical device that is communicatively coupled to the physical device that includes memory 116. In an embodiment, components of controller 108 can be spread across multiple physical devices (e.g., some components on the same die as the memory, and some components on a different die, module, or board) as a distributed controller.

The host 102 can include a host controller 104 to communicate with memory device 106. The host controller 104 can be coupled to and/or send commands to memory device 106 and/or controller 108 via host interface 103. The host controller 104 can communicate with memory device 106 and/or the controller 108 on the memory device 106 to read, write, and/or erase data, among other operations. For example, the host 102 can transmit a power on command to the memory device 106 to initialize (e.g., boot, turn on, start, etc.) the memory device 106 and/or transmit a trace failure command to receive a non-volatile memory die initialization failure. In a number of embodiments, the host 102 can further receive an alarm that the memory device 106 is unstable due to a non-volatile memory die initialization failure (e.g., an error occurring during the initialization of the non-volatile memory die).

Controller 108 on memory device 106 and/or the host controller 104 on host 102 can include control circuitry and/or logic (e.g., hardware and firmware). In an embodiment, controller 108 on memory device 106 and/or the host controller 104 on host 102 can be an application specific integrated circuit (ASIC) coupled to a printed circuit board including a physical interface. Also, memory device 106 and/or host 102 can include a buffer of volatile and/or non-volatile memory and one or more registers.

For example, as shown in FIG. 1, memory device 106 can include circuitry 110. In the embodiment illustrated in FIG.

1, circuitry 110 is included in controller 108. However, embodiments of the present disclosure are not so limited. For instance, in an embodiment, circuitry 110 may be included in (e.g., on the same die as) memory 116 (e.g., instead of in controller 108). Circuitry 110 can comprise, for instance, hardware, firmware, and/or software for performing operations described herein. For example, the circuitry 110 can be configured to initialize the controller 108 and a volatile memory die prior to initializing a non-volatile memory die.

Figure 2:
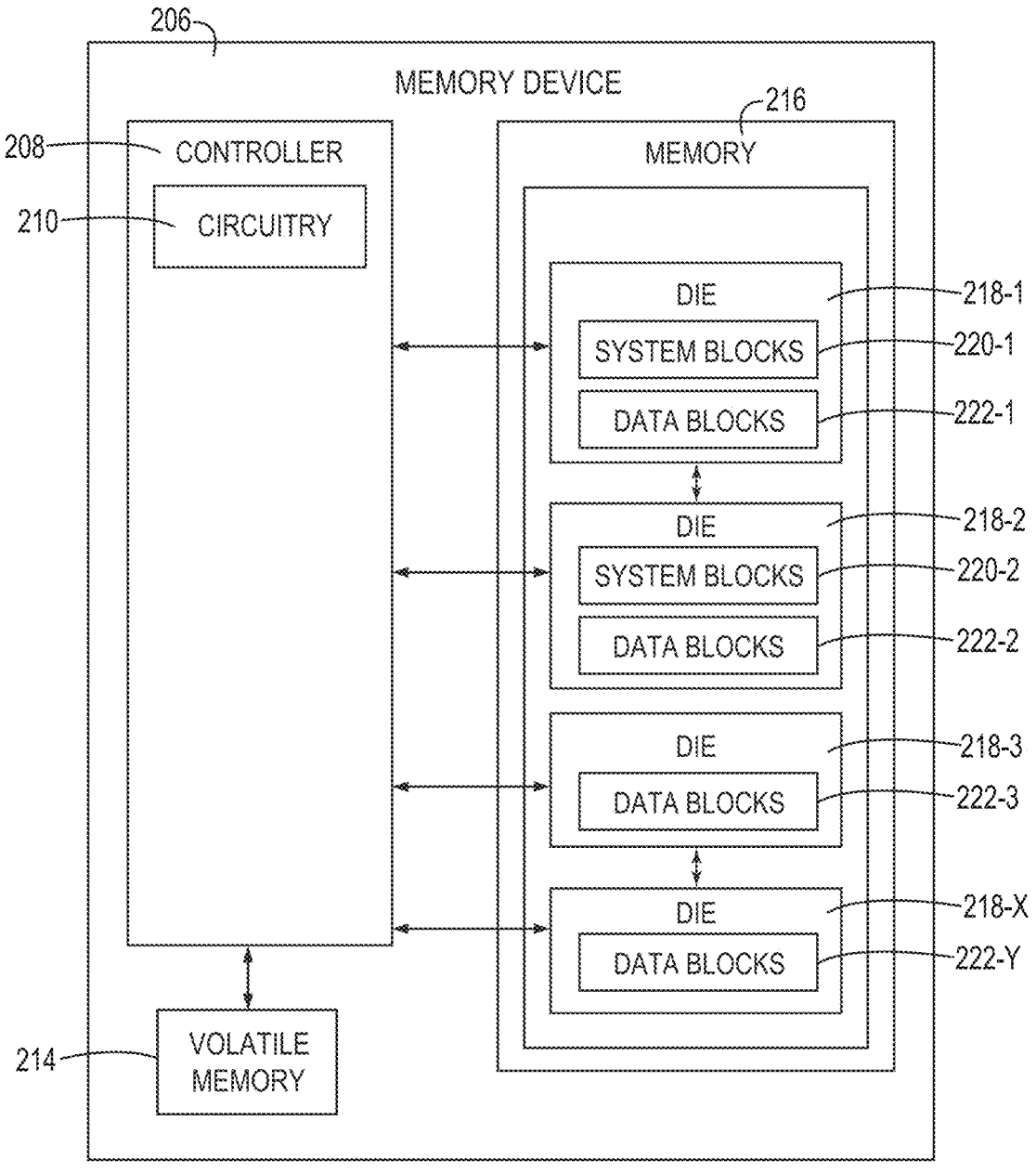
FIG. 2 is a block diagram of a memory device including a number of non-volatile memory dies in accordance with an embodiment of the present disclosure.

FIG. 2 is a block diagram of a memory device 206 including a number of non-volatile memory dies 218-1, 218-2, 218-3, and 218-X in accordance with an embodiment of the present disclosure. The memory device 206 can correspond to memory device 106 in FIG. 1. A controller 208 and a memory 216 corresponding to controller 108 and memory 116 in FIG. 1, respectively can be included in the memory device 206. The controller 208 can include circuitry 210 corresponding to circuitry 110 in FIG. 1. In some examples, the controller 208 can be coupled to a volatile memory die 214, which can include an SRAM array, for example.

The memory 216 can be non-volatile memory including the number of non-volatile memory dies 218-1, . . . , 218-X. In a number of embodiments, the non-volatile memory dies 218-1, . . . , 218-X can be NAND dies. Non-volatile memory dies 218-1 and 218-2 can include system blocks 220-1 and 220-2 and non-volatile memory dies 218-1, . . . , 218-X can include data blocks 222-1, 222-2, 222-3, and 222-Y. The system blocks 220-1 and 220-2 can be reserved blocks used to store executable instructions (e.g., firmware) and the data blocks 222-1, . . . , 222-Y can store other data. In a number of embodiments, the firmware can be for an autonomous vehicle and the other data can be sensor data from the autonomous vehicle.

The memory device 206 can receive a power on (e.g., boot, start, etc.) command from a host (e.g., host 102 in FIG. 1). The volatile memory die 214 can be initialized prior to initializing the plurality of the non-volatile memory dies 218-1, . . . , 218-X sequentially. In response to non-volatile memory die 218-1 including system blocks 220-1 storing executable instructions and in response to no previously initialized non-volatile memory die 218-2 including system blocks 220-2 storing the executable instructions, the executable instructions can be copied to the volatile memory die 214.

In a number of embodiments, the controller 208 of the memory device 206, followed by the volatile memory array 214, followed by non-volatile memory die 218-1 can be initialized in response to receiving a power on command. Initializing the controller 208, the volatile memory array 214, and non-volatile memory die 218-1 prior to the rest of the non-volatile memory dies 218-2, . . . , 218-X can prevent non-volatile memory initialization failures from going unrecorded because the volatile memory array 214 can provide executable instructions to the host for the host to execute so that the identity of one or more of the number of non-volatile memory dies 218-1, . . . , 218-X that have an error occur during initialization can be stored.

The executable instructions can store the failure history and the failure information in one of the number of non-volatile memory dies 218-1, . . . , 218-X that is valid (e.g., did not fail). In a number of embodiments, a failure record can be stored in a successfully initialized one of the plurality of non-volatile memory dies 218-1, . . . , 218-X in response to a failure of any of the plurality of non-volatile memory dies 218-1, . . . , 218-X during initialization thereof. For example, if non-volatile memory die 218-2 has an initialization failure, the failure information including the identity of non-volatile memory die 218-2 can be stored in non-volatile memory die 218-1.

In some examples, the memory device 206 can provide an alarm to the host that the memory device 206 is unstable in response to recording a failure. The memory device 206 can transmit a failure record to the host via a host interface (e.g., host interface 103 in FIG. 1) in response to a request thereof received via the host interface and/or in response to initializing the non-volatile memory die 218-2 that previously had an initialization failure again without an error occurring.

Failure history and failure information can be traced once the memory device 206 is back to a normal state including a proper (e.g., error free) initialization with correct power ramping and sequencing. The executable instructions can allow the host to trace the failure history and the failure information through a trace failure command. The failure history and the failure information can be provided as a failure record and/or a health report including a number of failure records, which can allow the host to detect which one or more of the number of dies 218-1, . . . , 218-X have failed at the initialization stage.

In response to the health report, the host can take measures to improve the reliability and stability of the memory device 206 and can more efficiently and accurately conduct a failure analysis. For example, the health report can include providing a failure record to the host by identifying the non-volatile memory die 218-2 in response to initializing the non-volatile memory die 218-2 again without the error occurring. This allows the host to take actions to replace the non-volatile memory die 218-2 and/or adjust a power supply rail for power up ramping of the memory device 206, for example.

Without a health report, more time could be wasted debugging the memory device 206 and/or the initialization failure issue could go unresolved. An unresolved initialization failure could lead to dangerous or deadly consequences. For example, an initialization failure of the memory device 206 in a vehicle could lead to an accident.

If an initialization failure occurs on non-volatile memory dies 218-1 and/or 218-2 that store system blocks 220-1 and 220-2, the system blocks 220-1 and/or 220-2 can be re-mapped and/or copied to one of the other non-volatile memory dies 218-3 and/or 218-X. For example, if non-volatile memory die 218-2 has an initialization failure, system block 220-2 can be remapped to non-volatile memory die 218-1, non-volatile memory die 218-3, and/or non-volatile memory die 218-X. This can make the memory device 206 more reliable by preventing potential data loss. In a number of embodiments, the system blocks 220-1 and 220-2 can be re-mapped in response to storing the failure record.

FIG. 3 is a flow diagram of a method 330 for storing non-volatile memory initialization failures in accordance with an embodiment of the present disclosure. At block 332, the method 330 can include initializing a volatile memory die (e.g., volatile memory die 214 in FIG. 2). The volatile memory die can be initialized in response to initializing a controller (e.g., controller 208 in FIG. 2). The volatile memory die can be an SRAM die, for example.

The volatile memory die can be initialized prior to non-volatile memory dies (e.g., non-volatile memory dies 218-1, . . . , 218-X in FIG. 2) to allow the host to receive the executable instructions (e.g., firmware) with store and download capabilities from the volatile memory die and allow the host to execute the executable instructions in response to receiving the executable instructions from the volatile memory die. Accordingly, if an error occurs during an initialization of a non-volatile memory die, the executable instructions can store the failure and/or download a copy of the executable instructions code onto another non-volatile memory die.

At block 334, the method 330 can include initializing a first non-volatile memory die in response to initializing the volatile memory die. The first non-volatile memory die can store the executable instructions. The first non-volatile memory die can be initialized before other non-volatile memory dies because it stores the executable instructions to run the memory device. For example, the method 330 can further include initializing the first non-volatile memory die prior to initializing the second non-volatile memory die in response to storing the executable instructions in the first non-volatile memory die.

At block 336, the method 330 can include copying executable instructions from the first non-volatile memory die to the volatile memory die in response to initializing the first non-volatile memory die. If the first non-volatile memory die stores the executable instructions, a host can receive the executable instructions from the first non-volatile memory die via the volatile memory die and the host can execute the executable instructions.

At block 338, the method 330 can include initializing the second non-volatile memory die in response to initializing the first non-volatile memory die. The second non-volatile memory die can be initialized after the first non-volatile memory die if the second non-volatile memory die does not store the executable instructions.

In some examples, the second non-volatile memory die can back-up the executable instructions by storing the executable instructions. For example, the second non-volatile memory die can include a copy of the executable instructions. Accordingly, the method can further include initializing the second non-volatile memory die instead of a third non-volatile memory die in response to storing the executable instructions in the second non-volatile memory die. If the firs non-volatile memory die, the second non-volatile memory die, and the third non-volatile memory die store the executable instructions, any one of them can be initialized first.

At block 340, the method 330 can include storing a failure record in the first non-volatile memory die in response to an error occurring during the initialization of the second non-volatile memory die. In some examples, the method 330 can further include initializing the second non-volatile memory die again without the error occurring in response to initializing the first non-volatile memory die again. Data can be copied from the second non-volatile memory die to the first non-volatile memory die and/or a third non-volatile memory die in response to initializing the second non-volatile memory die again without the error occurring to prevent the data from being lost, corrupted, or further corrupted.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
copying executable instructions from a first non-volatile memory die to a volatile memory die;
initializing a second non-volatile memory die; and
storing a failure record in the first non-volatile memory die in response to an error occurring during the initialization of the second non-volatile memory die.

2. The method of claim 1, wherein the method includes initializing the volatile memory die prior to copying the executable instructions from the first non-volatile memory die to the volatile memory die.

3. The method of claim 1, wherein the method includes initializing the first non-volatile memory die prior to copying the executable instructions from the first non-volatile memory die to the volatile memory die.

4. The method of claim 3, wherein the method includes copying the executable instructions from the first non-volatile memory die to the volatile memory die in response to initializing the first non-volatile memory die.

5. The method of claim 3, wherein the method includes initializing the first non-volatile memory die in response to initializing the volatile memory die.

6. An apparatus, comprising:
a volatile memory die;
a first non-volatile memory die;
a second non-volatile memory die; and
a controller coupled to the volatile memory die, the first non-volatile memory die, and the second non-volatile memory die, the controller including circuitry configured to:
copy executable instructions from the first non-volatile memory die to the volatile memory die in response to initializing the first non-volatile memory die;
initialize the second non-volatile memory die; and
store a failure record in the first non-volatile memory die in response to an error occurring during the initialization of the second non-volatile memory die.

7. The apparatus of claim 6, further comprising a plurality of non-volatile memory dies including the first non-volatile memory die and the second non-volatile memory die.

8. The apparatus of claim 7, wherein the circuitry is configured to initialize the plurality of non-volatile memory dies sequentially.

9. The apparatus of claim 6, wherein the circuitry is configured to initialize the second non-volatile memory die again without the error occurring.

10. The apparatus of claim 9, wherein the circuitry is configured to copy data from the second non-volatile memory die to the first non-volatile memory die in response to initializing the second non-volatile memory die again without the error occurring.

11. The apparatus of claim 9, wherein the circuitry is configured to copy data from the second non-volatile memory die to a third non-volatile memory die in response to initializing the second non-volatile memory die again without the error occurring.

12. The apparatus of claim 6, wherein the first non-volatile memory die includes first blocks to store the executable instructions and second blocks to store data.

13. The apparatus of claim 6, wherein the second non-volatile memory die includes blocks to store a copy of the executable instructions.

14. The apparatus of claim 6, further comprising:
a third non-volatile memory die; and
a fourth non-volatile memory die;
wherein the controller is further configured to initialize the third non-volatile memory die and the fourth non-volatile memory die sequentially after the first non-volatile memory die and the second non-volatile memory die.

15. A system, comprising:
a host;
a memory device including:
a volatile memory die;
a first non-volatile memory die; and
a second non-volatile memory die; and
a controller including circuitry configured to:
copy executable instructions from the first non-volatile memory die to the volatile memory die in response to initializing the first non-volatile memory die;
initialize the second non-volatile memory die in response to initializing the first non-volatile memory die; and
store a failure record in the first non-volatile memory die in response to an error occurring during the initialization of the second non-volatile memory die.

16. The system of claim 15, wherein the controller is further configured to initialize the controller in response to receiving a power on command from the host.

17. The system of claim 16, wherein the controller is further configured to initialize the volatile memory die in response to initializing the controller.

18. The system of claim 17, wherein the controller is configured to initialize the first non-volatile memory die in response to initializing the volatile memory die.

19. The system of claim 15, wherein the host is configured to transmit a trace failure command.

20. The system of claim 19, wherein the controller is configured to transmit the failure record to the host in response to receiving the trace failure command from the host.

* * * * *